(12) United States Patent
Bozso et al.

(10) Patent No.: US 7,120,327 B2
(45) Date of Patent: Oct. 10, 2006

(54) BACKPLANE ASSEMBLY WITH BOARD TO BOARD OPTICAL INTERCONNECTIONS

(75) Inventors: Ferenc M. Bozso, Ridgefield, CT (US); Philip G. Emma, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 10/305,853

(22) Filed: Nov. 27, 2002

(65) Prior Publication Data

US 2004/0100782 A1    May 27, 2004

(51) Int. Cl.
*G02B 6/26* (2006.01)
(52) U.S. Cl. .......................................... 385/15; 385/24
(58) Field of Classification Search ................. 385/15, 385/16, 22–24
See application file for complete search history.

(56) References Cited

U.S. PATENT DOCUMENTS 5,245,680 A * 9/1993 Sauter ........................ 385/24

6,661,940 B1 * 12/2003 Kim ............................ 385/15
2002/0021855 A1    2/2002 Kim

FOREIGN PATENT DOCUMENTS

WO      WO 96/10763       4/1996

* cited by examiner

*Primary Examiner*—Jennifer Doan
(74) *Attorney, Agent, or Firm*—Law Office of Charles W. Peterson, Jr.; Louis J. Percello, Esq.; Satheesh K. Karra, Esq.

(57) ABSTRACT

An electronic system with components communicating over optical channels, a board initialization and continuity check and a method of transferring data over the optical channels. The system include a backplane with board to board signal wiring and a shared optical bus. Optical gratings are attached to the backplane and to circuit boards to pass optical energy between an optical transceiver and board/backplane. An optical transceiver at each end of each optical jumper relays optical signals between the optical jumpers and the connected circuit board or the backplane. Optical jumpers optically connect the circuit boards to the backplane.

51 Claims, 15 Drawing Sheets

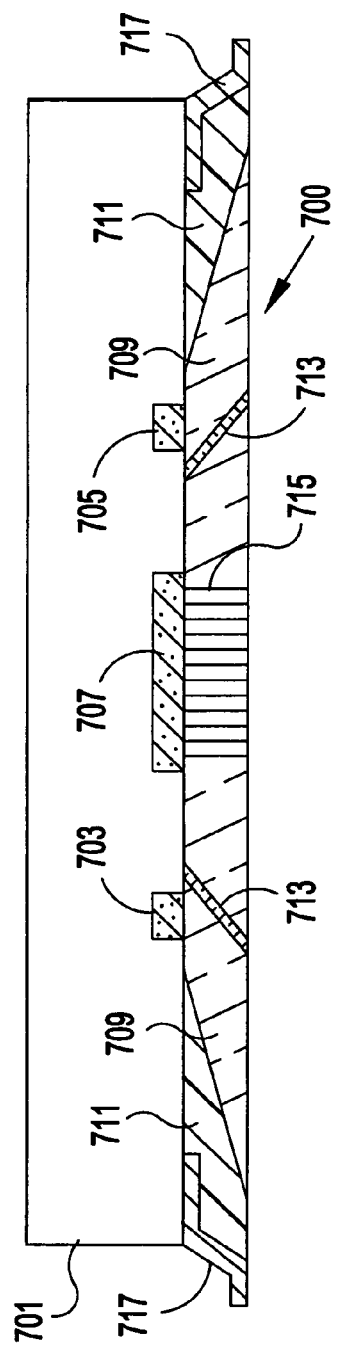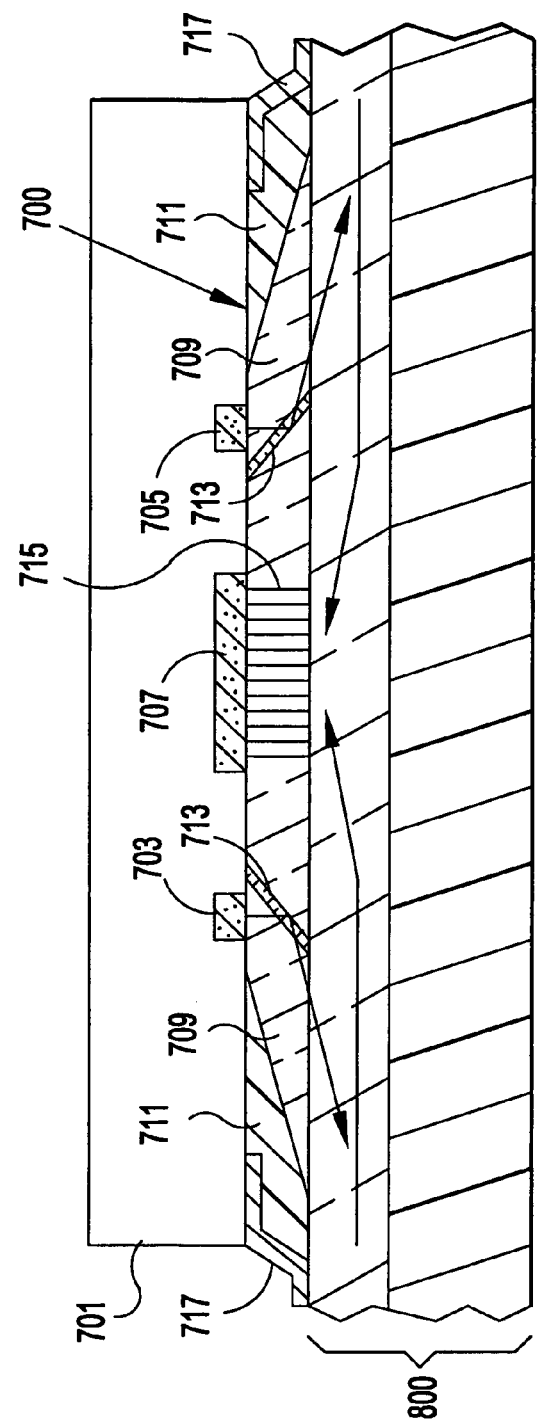
FIG.7
FIG.8

BACKPLANE ASSEMBLY WITH BOARD TO BOARD OPTICAL INTERCONNECTIONS

CROSS REFERENCE TO RELATED APPLICATIONS

The present application is related to U.S. patent application Ser. No. 10/305,822 entitled "OPTICALLY CONNECTABLE CIRCUIT BOARD WITH OPTICAL COMPONENT(S) MOUNTED THEREON" to Boszo et al., filed coincident herewith and assigned to the assignee of the present invention.

BACKGROUND OF THE INVENTION

1. Field of the Invention

The present invention generally relates to high-speed inter chip optical connections and more particularly to high speed optical inter board connections between logic and/or memory chips on different printed circuits, e.g., connected to a backplane.

2. Description of the Related Art

FIG. 1 shows an example of a state of the art electro-optical assembly 100 with a passive backplane 101 connecting two circuit boards 103 each with mounted electro-optical components 105. The boards 103 pass signals to each other over the passive backplane 101 through connectors 107. Chips 108, 110, 112, 114 populate and are packaged in the optical component modules 105.

FIGS. 2A–B show an example of typical orthogonal cross sections of the general board structure 200 of either/both of the backplane and circuit boards. This passive board structure 200 includes both electrical wiring channels 203 and optical wiring channels 205. A dielectric backplane/board material 201 provides a mechanical structure for maintaining and protecting the embedded copper wiring infrastructure and power distribution on wiring channels 203. Wiring channels 203 provide electronic signal media in the X and Y dimensions with interlayer or interlevel vias (not shown) connecting electrical signals between different wiring layers.

On one surface of the backplane/board are optical wave guides 205, which are shown here in a single layer. These optical wave guides 205 can be a suitable polymer or glass material deposited on the preexisting surface of the backplane/board material, or it can be an independently manufactured structure containing polymers or glass or optical fibers, that is laminated onto the board material. A fill material 207 separates the optical wave guides. The fill 207 provides isolation and planarity.

So, from FIG. 1 typical losses in a chip-to-chip (e.g., 108–112) optical path crossing the backplane 101 can be determined. In this example, the onboard path may be 50 centimeters for each board 103, with the boards spaced apart on the backplane 101 by 1 meter. The optical material is a polymer, for example. A typical board polymer exhibits a 0.03 dB/cm loss and a typical backplane polymer exhibits a 0.05 dB/cm loss. A typical chip to board coupling loss is 3 dB and a typical board to backplane connector loss is 2 dB. Thus, for this path, the signal loss is 18 dB.

This 18 dB signal loss is substantial and, remembering that each 3 dB drop corresponds to loss of halving the signal, corresponds to a sixty four time signal reduction, i.e., the receiver signal at chip 114 is 1/64 the strength at chip 108. So, to compensate for an 18 dB loss the transmitted signal at chip 108 must have 64× the signal required at the receiver chip 114. This is an unacceptable power requirement, particularly when tens of these signals are required for a typical data path and well in excess of what is usually allowed for data communications optical paths.

There are a number of known approaches to driving down these losses. Chip-to-board coupling losses can be reduced with better electro-optical packaging. Better materials can be used to reduce Channel losses, e.g., laminating fibers into the board (instead of depositing a polymer) is a costly approach to making channel losses negligible. Finally, improved (and more expensive) connectors can reduce board-to-backplane coupling loss. Connector losses result primarily from mechanical mismatches and so, can be improved by reducing tolerances, e.g., with precision mechanical machining. Unlike material changes (e.g., in the channels), precision mechanical machining requires new and better tools and processing, which is not an incremental cost increase. Each of these three state of the art approaches produce incremental improvements only with solving difficult engineering problems accompanied by sometimes dramatic cost increases. It may be possible using some combination of these approaches to reduce the loss of the above example from 18 dB to an acceptable level, e.g., 9 dB or an 8× reduction from the transmitted signal to the receiver.

FIG. 3 shows an example of a multidrop backplane 300, e.g., in a large switch or a server backplane. There may be thousands of such signals on a typical such backplane 300. Such a multidrop backplane 300 is particularly suited for servers to bus or distribute (multidrop) the signals, i.e., to fan out each transmitted signal in parallel to numerous (e.g., 8, 16, or even 32) boards 302 connected to the backplane 300.

However, with the boards 302 connected to "tap points" along the backplane optical channels, some signal is lost at each tap point. So, if each "tap point" causes a few dB signal drop from the originally transmitted signal strength (a 3 dB drop per tap point is quite optimistic), adding 3 boards to the improved path increases the total signal loss back to 18 dB. Clearly, the added work and expense has not provided for inclusion of more than a few more boards. For thousand of signals (instead of tens of signals), the total power required is prohibitive.

Furthermore, such a 4 to 5 board system would be inflexible, unscalable beyond 5 boards. Likewise removing 1 or 2 boards for a midrange system would not scale particularly easily either. Signal integrity and radiation issues would arise in the infrastructure which is designed for the 4–5 board system.

Thus, there is a need for an assembly including a backplane with multiple boards optically connected together for use in a large switch or in a server. There is a further need for such an assembly that may be constructed from a wide range of wave guide materials and in particular, those that are tolerant of channel loss. Further, there is a need for such an assembly that is tolerant of mechanical misalignment, thereby avoiding a requirement for precise mechanical alignment (i.e., that is tolerant of large coupling loss in the board-to-backplane connectors). There is also a need for such an assembly that allows multidropping signals transmitted from one board, so that multiple boards can receive the signal. Finally, there is a need for a scalable assembly that allows for a wide range of system scaling (i.e., a few boards to many boards) on a single physical infrastructure or backplane.

SUMMARY OF THE INVENTION

It is a purpose of the present invention to improve system communications;

It is yet another purpose of the invention to improve board to board communications.

The present invention relates to an electronic system with components communicating over optical channels, a board initialization and continuity check and a method of transferring data over the optical channels. The system include a backplane with board to board signal wiring and a shared optical bus. Optical gratings are attached to the backplane and to circuit boards to pass optical energy between an optical transceiver and board/backplane. An optical transceiver at each end of each optical jumper relays optical signals between the optical jumpers and the connected circuit board or the backplane. Optical jumpers optically connect the circuit boards to the backplane.

BRIEF DESCRIPTION OF THE DRAWINGS

The foregoing and other objects, aspects and advantages will be better understood from the following detailed description of illustrative embodiments of the invention with reference to the drawings, in which:

FIG. 7 shows an example of a cross section of a grating structure for coupling transceiver optics in a chip to an optical channel on a board or backplane according to a preferred embodiment of the present invention;

FIG. 8 shows an example of a preferred gating structure and chip mounted on a board structure, e.g., a backplane;

DESCRIPTION OF PREFERRED
EMBODIMENTS OF THE INVENTION

Figure 1:
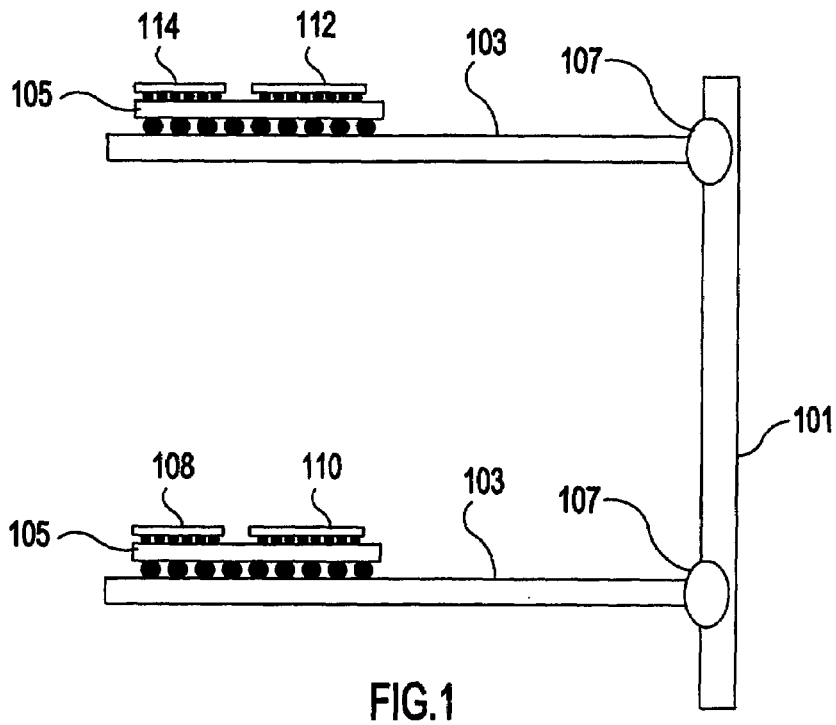
FIG. 1 shows an example of a state of the art electro-optical assembly with a passive backplane connecting two circuit boards each with mounted electro-optical components.
Figure 2A:
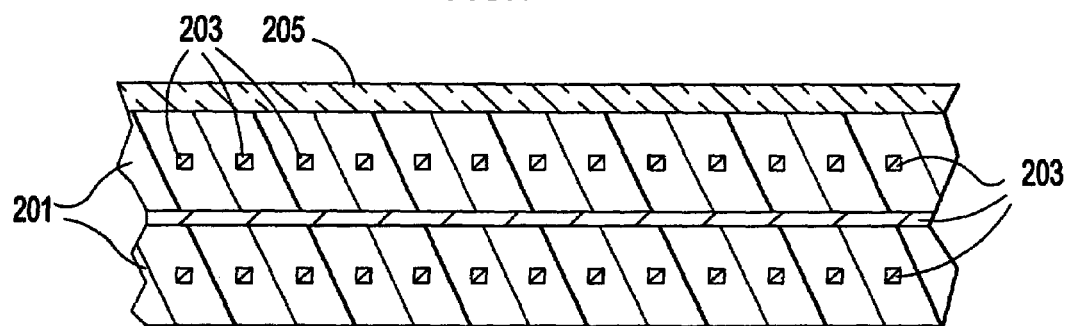
FIGS. 2A–B show an example of typical orthogonal cross sections of the general board structure of either/both of the backplane and circuit boards.
Figure 2B:
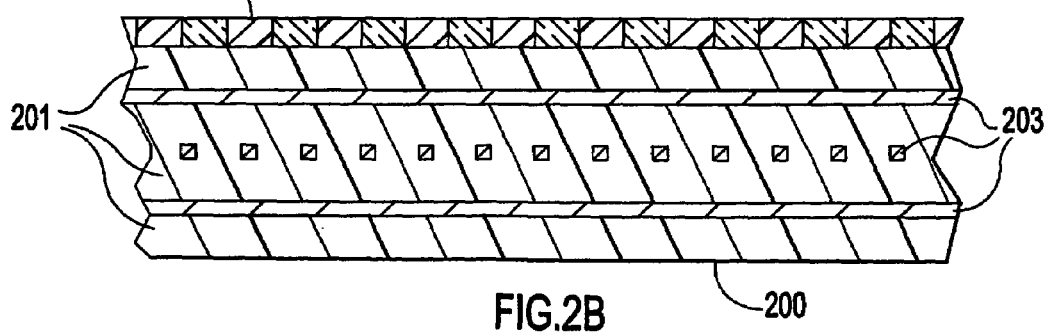
Figure 3:
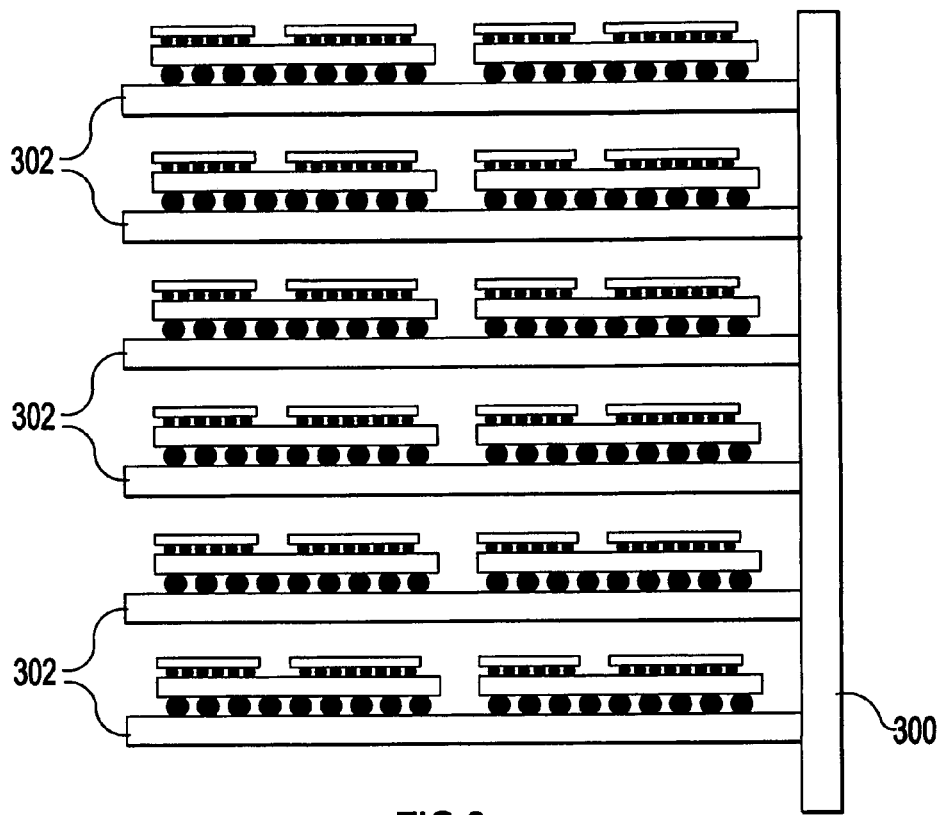
FIG. 3 shows an example of a multidrop backplane, e.g., in a large switch or a server backplane.
Figure 4:
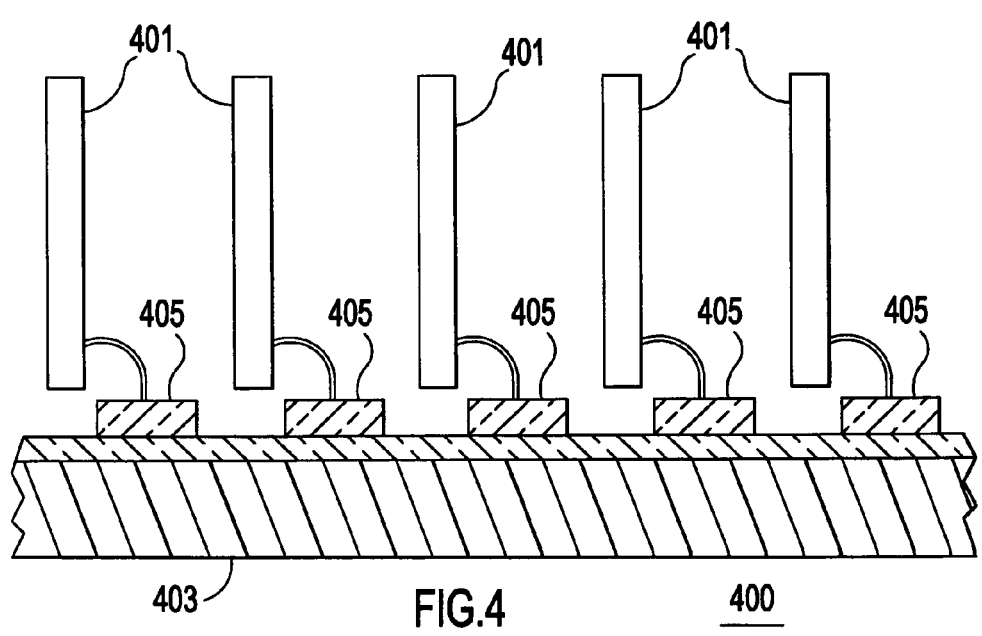
FIG. 4 shows an example of a backplane assembly according to a embodiment of the invention.

Turning now to the drawings and, more particularly, FIG. 4 shows an example of a backplane assembly 400 according to a preferred embodiment of the invention. The backplane assembly 400 may embody a stand alone system (e.g., a server or a mainframe) or system unit in a larger stand alone system. Each board 401 is mounted on and optically connected to the backplane 403 through an optical transceiver 405. It should be noted that board inputs and outputs can be either electrical or optical. The optical transceiver 405 receives inputs and repeats or relays the received input optical signals using its own active circuitry. The repeated signals are transmitted to the transceiver outputs.

The optical transceivers 405 isolate all board losses from the backplane losses, thereby making each of the board design specifics irrelevant to and independent of the backplane design and vice-versa. Thus, the onboard losses are self-contained within each board 401 and do not add to the backplane losses. Likewise, backplane losses are self-contained within the backplane 403 and do not affect board losses. Thus, fan-out on the backplane 403 is a self-contained and manageable design problem. Also, very lossy connectors can be used to connect the boards to the transceivers 405, since the connector loss is isolated and so, not additive to the backplane loss.

Figure 5:
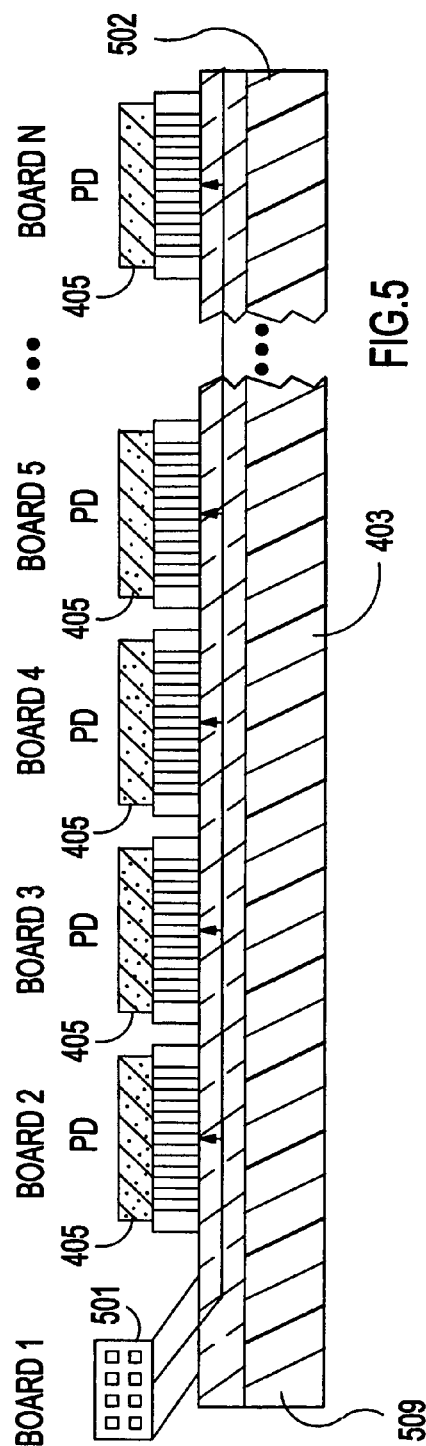
FIG. 5 illustrates fan-out on the self-contained backplane of FIG. 4.

FIG. 5 illustrates fan-out on the self-contained backplane 403 of FIG. 4. A laser source 501 is shown at one end (i.e., on an unshown board located there) of the backplane 403 for the worst-case optical path 505 in this N-board system example. The worst case path 505 spans the entire backplane 403, incurring the maximum possible channel loss, fanning out to all of the remaining N−1 transceivers 405 along the channel or path 505.

So, for example, a photodetector in each transceiver may require a 20 μW optical signal to sense the signal properly, e.g., at several GHz. With a 3 dB backplane-to-photodetector loss in the grating coupling 503, optical power to the end or Nth transceiver must be at least 40 μW at the far end 502 of the board 403. The optical gratings 503 are identical and each outcouples something less than 100% of the power in the channel, i.e., some portion (X%) is outcoupled. So, for an N board system, the link budget must accommodate N−1 grating losses (i.e., (N−1)*X%) plus the the 3 dB channel loss. For a 10 mW laser 501 at 40% quantum yield and with a 3 dB coupling loss to the backplane channel 505, delivers 2 mW to the channel 505 directly under the laser 501 at the left end 509. Thus, Table 1 shows an example of a link budget for this example for different values of X, in this example for X=2, 4, 6, 8, and 10. Channel loss outcoupling amounts are compared for each value against how much power is required to reach the far end and the total link budget for 2 mW (2000 µW) at the source.

TABLE 1

Link Budget Calculation

| % Outcoupled Power per Grating | Corresponding Loss per grating (dB) | Power Required at the Far End (µW) | Link Budget with 2000 µW at Source |
|---|---|---|---|
| 2 | 0.09 | 2,000 | 0 |
| 4 | 0.18 | 1,000 | 3 |
| 6 | 0.27 | 667 | 4.8 |
| 8 | 0.36 | 500 | 6 |
| 10 | 0.46 | 400 | 7 |

Figure 6:
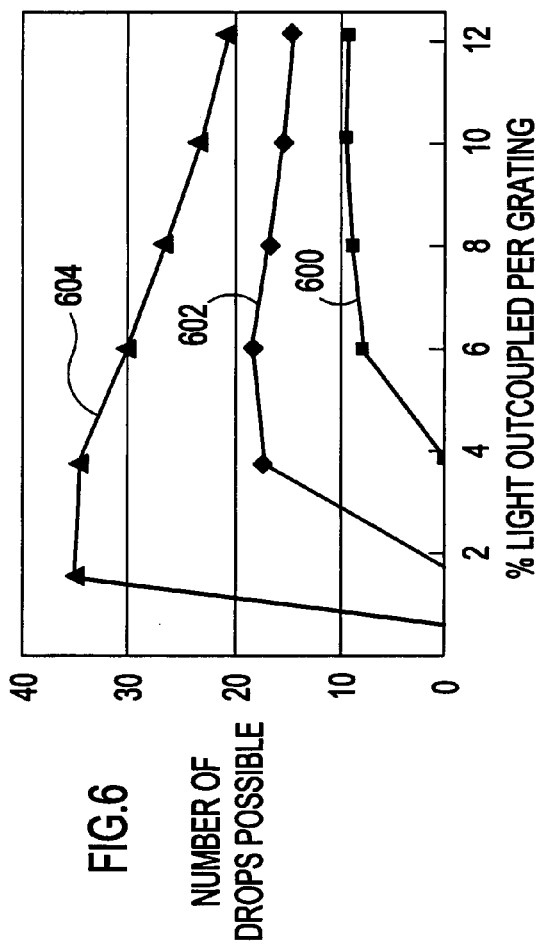
FIG. 6 is a plot of achievable number of boards N vs. percent of outcoupled power per grating.

FIG. 6 is a plot of achievable system size (number of boards N) vs. percent of outcoupled power per grating (X% which is a design parameter) based on Table 1 for three examples. In the lowest curve 600, the channel is 1 meter with a 0.03 dB/cm channel loss and a maximum system size of 10 boards. This 10 board maximum is achieved with the gratings designed for 10–12% outcoupling. The middle curve 602 shows a lossless channel material (e.g., fiber) has an 18 board maximum system size with gratings designed for 6% outcoupling. Alternately, this 18 board maximum can be achieved with the middle curve 600 by doubling source laser power, e.g., by using 2 lasers instead of 1. The highest curve 604 shows a channel with both a lossless material and source laser power doubled achieves a 35 board system maximum with gratings having 2–4% outcoupling.

FIG. 7 shows an example of a cross section of a grating structure 700 for coupling transceiver optics in a chip 701 to an optical channel on a board or backplane according to a preferred embodiment of the present invention. The chip 701 contains a laser 703 that transmits light in one direction, a laser 705 that transmits light in the opposite direction and a photodiode 707 receiving and detecting laser energy from other boards. The two lasers 703, 705 are driven by the same chip signal (not shown). Two lasers 703, 705 accommodate internal backplane board positions, i.e., those that are not at either end of the backplane. One laser 703 transmits to boards to one side, e.g., its left, and the other laser 705 transmits boards on its other side, i.e., to its right. The photodiode 707 senses light traveling in the channel that is outcoupled from the backplane (not shown) by the grating structure 700 to the chip 701.

In this example, a tapered matched-index layer 709 is insulated by a low-index material 711. Mirrors 713 direct incident laser light from the chip 701 to either side (e.g., leftwards or rightwards) into the channel (not shown). A grating 715 in the matched-index layer 709 is designed to provide the desired amount of outcoupling as provided above in Table 1 and FIG. 6. Power connections 717 connect power from the backplane or board (not shown) to the optoelectronics circuits on the chip 701.

FIG. 8 shows an example of a preferred gating structure 700 and chip 701 mounted on a board structure 800, e.g., a backplane. The grating structure 700 provides coupling between the chip 701 and the optical channel 802 in the board structure 800. It should be noted that the photodiode 707 does not sense light transmitted from the same chip 701 because, the mirrors 713 direct the light away from the grating 715 (i.e., to the left and the right) and the photodiode 707 is in the center of the chip 701 above the grating 715.

Figure 9A:
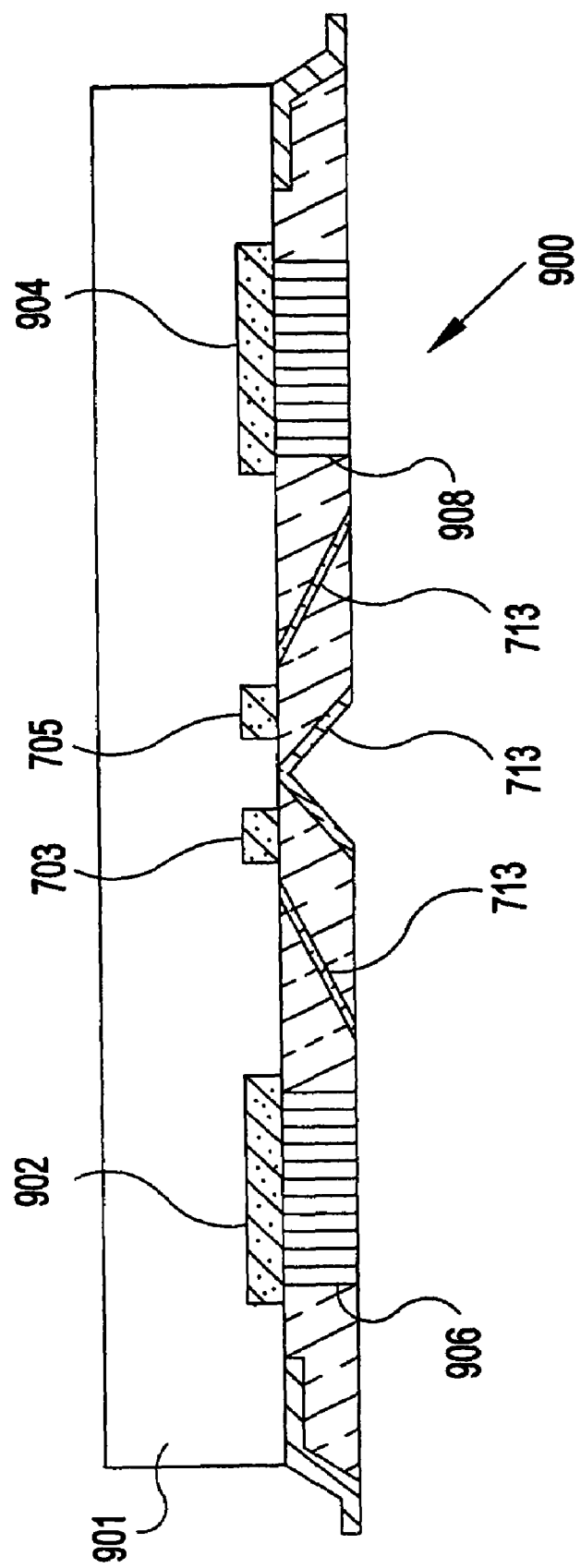
FIG. 9A shows an example of an alternative embodiment grating structure.

FIG. 9A shows an example of an alternative embodiment grating structure 900 with like elements labeled identically. In this embodiment 900, the lasers 703, 705 are in the center of the chip 901 and a pair of identical photodiodes 902, 904 and gratings 906, 908 are located on either side of the lasers 703, 705. The two photodiodes 902, 904 are wired together (not shown) to act as a single photodiode. The advantage of this embodiment is that the photodiodes 902, 904 can sense light in the channel that was transmitted by this same chip, which may be used in testing.

Figure 9B:
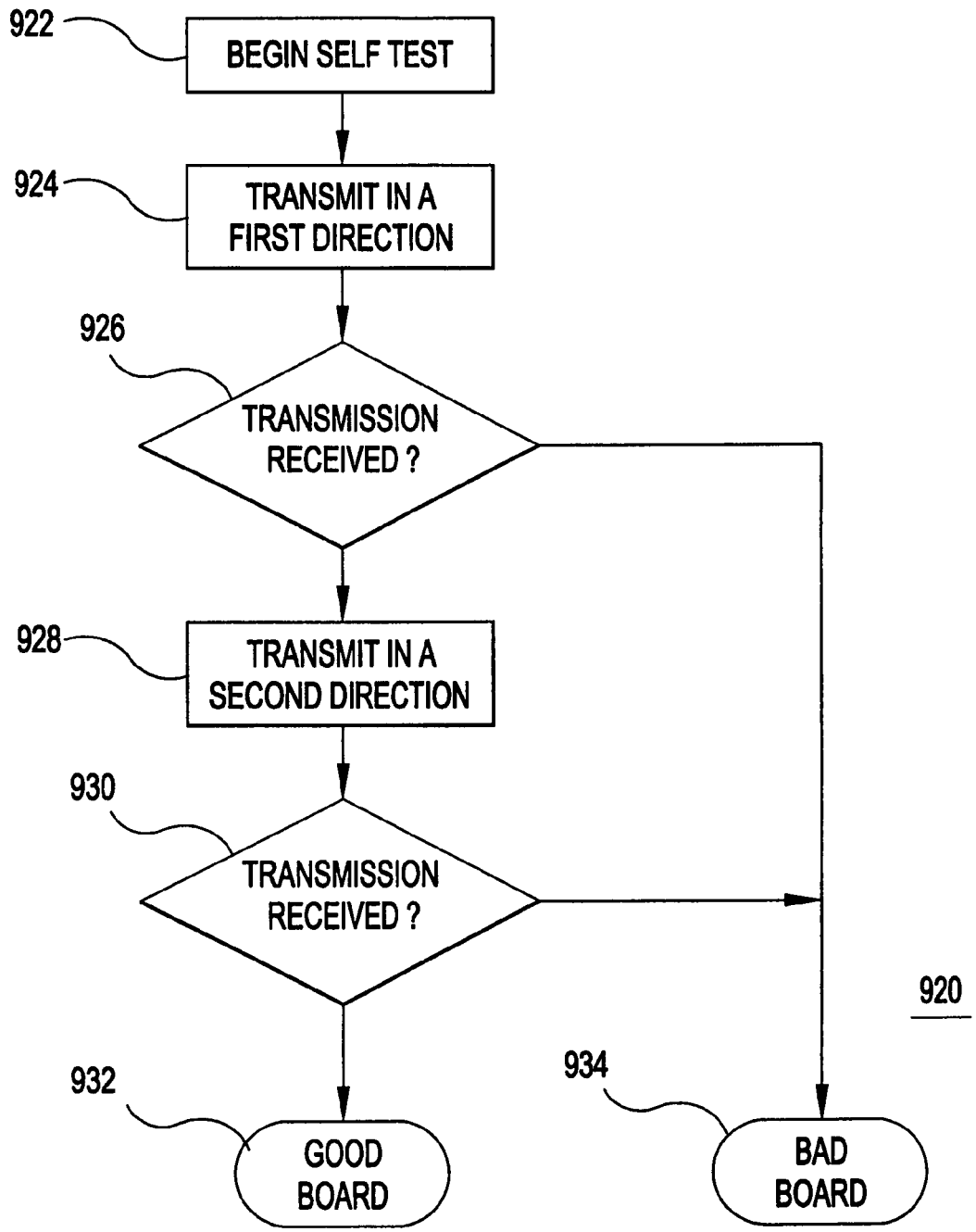
FIG. 9B shows a method of continuity checking boards with the grating structure of FIG. 9A.

Furthermore, this embodiment 900 lends itself to a simple optical continuity check 920 in FIG. 9B when the board it is inserted into the backplane, i.e., during a board self-test sequence. During the self test, the channels are held open in step 922 by other connected boards, i.e., no other boards have access to the optical bus as described in further detail hereinbelow. Then, each transceiver 900 on the board, transmits a 1 followed by a zero, first in one direction in step 924, e.g., to the left by the left laser 703 and then, in the other direction in step 928 by the other (right) laser 705. With each transmission, the corresponding photodiode 902 or 904 is checked in 926, 930 respectively, to see whether they reflect what was transmitted, i.e., what is seen by the board. If what is received matches what was sent, the signal made it off of the board into the backplane channel and then back out of the channel into the board, i.e., the connection is good in step 932. Otherwise, in step 934 the board is bad.

Figure 10:
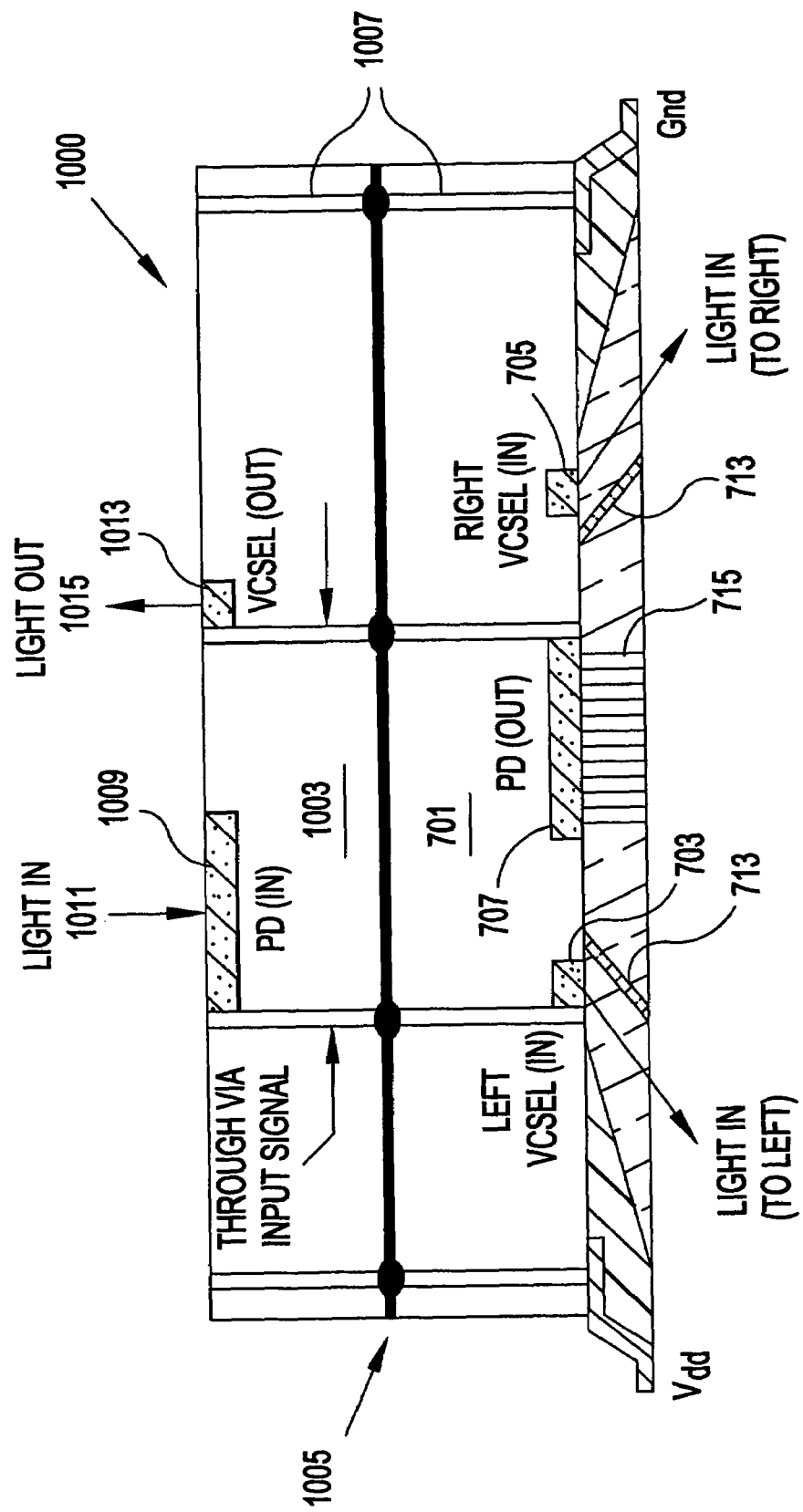
FIG. 10 shows an example of a structure for coupling an optical signals from external light source/sink to the on-backplane transceivers.

FIG. 10 shows an example of a structure 1000 for coupling an optical signals from external light source/sink to the on-backplane transceivers 701. In this example, a second chip 1003 is flip mounted back to back with on-backplane transceivers 701. The second chip 1003 also contains a laser 1013 and a photodiode 1009 and a solder interface 1005 connects it through vias 1007 to the first chip 701. Through vias 1007 provide power to the top chip 1003 and pass selected electrical signals between the two chips 701, 1003.

The photodetector 1009 on the top transceiver chip 1003 detects light 1011 from an external source, e.g., from a connected board or chip. The top photodetector 1009 converts the external light into an electrical signal and relays the electrical signal through the vias 1007 to drivers (not shown) for the lasers 703, 705 in the bottom chip 701. The lasers 703, 705 in the bottom chip 701 converts the electrical signal to an optical signal to recreate the optical signal, which is relayed to the backplane channel (not shown in this example) as previously described.

Signals in the opposite direction originate when the photodetector 707 on the bottom transceiver chip 701 detects/senses light in the backplane channel (not shown). The photodetector 707 converts the detected light into an electrical signal. The electrical signal passes back over through vias 1007, to a driver (not shown) for the laser 1013 in the top transceiver chip 1003. The laser 1013 in the top chip 1003 recreates the optical signal, and relaying the optical signal 1015 to an external sink, e.g., to a board.

Figure 11:
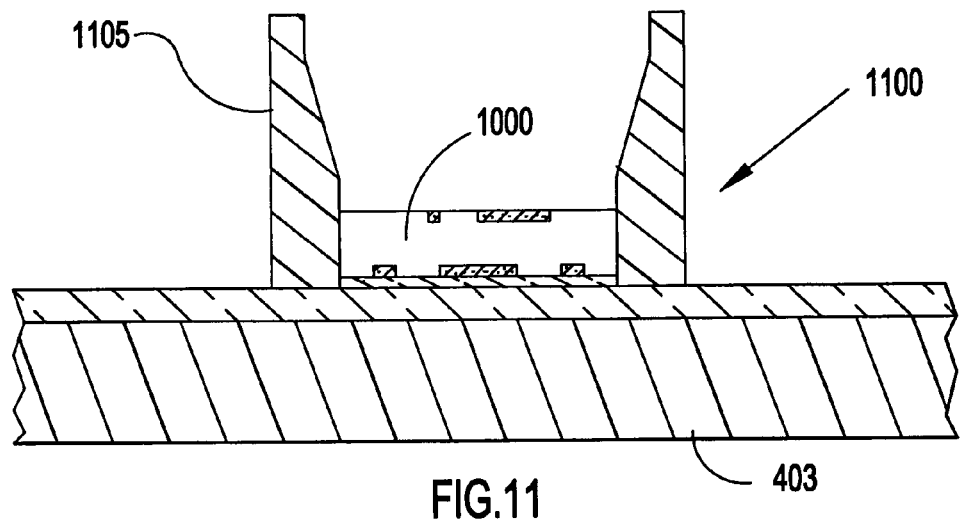
FIG. 11 shows an example backplane attachment structure.

FIG. 11 shows an example backplane attachment structure or backplane optical socket 1100. In this example, the dual-chip electro-optical transceiver 1000 is connected to a backplane 403 and "potted" into a flanged structure 1105 for easy attachment with an optical plug that is tolerant of fairly crude alignment.

Figure 12:
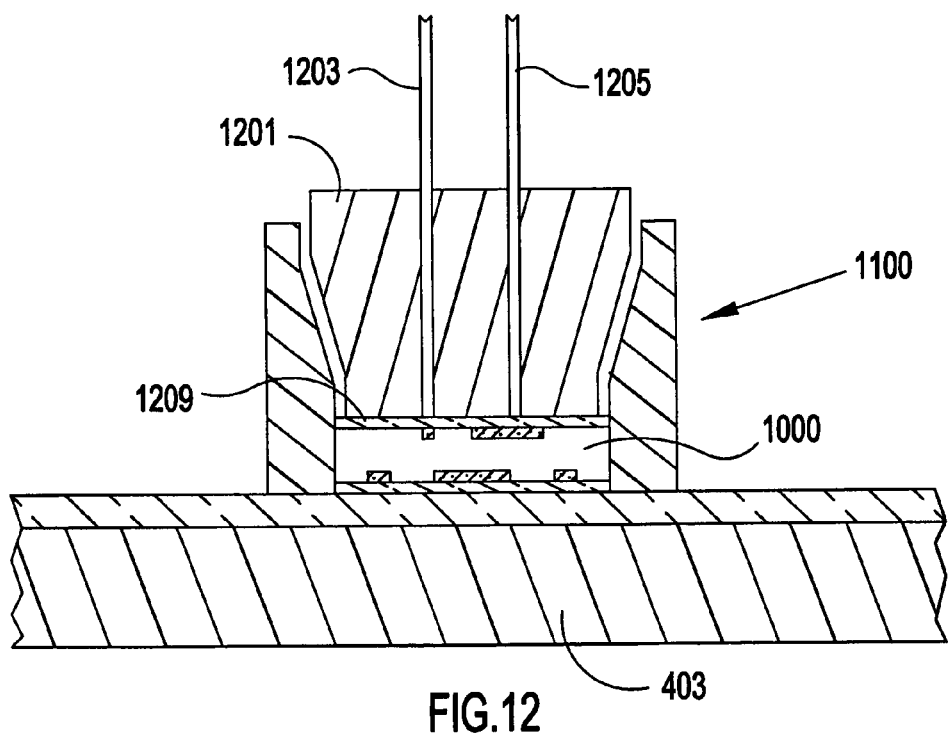
FIG. 12 shows a male optical plug inserted into the female flanged structure.

FIG. 12 shows a male optical plug 1201 inserted into the female flanged structure of the backplane optical socket 1100. The plug 1201 contains fibers 1203, 1205 carrying optical inputs 1203 and optical outputs 1205. The plug 1201 mechanically butts against the top chip 1003 of the dual-chip transceiver structure 1000. Optionally, this butted connection forms a raw optical interface 1209 that can be enhanced with optical gels. Thus, provided that the fiber loss is negligible, only the interface 1209 is lossy in the connection. It should be noted that the plug 1201 and associated cable 1203, 1205 can be plugged into a circuit board that is plugged into this same backplane 403 as further described hereinbelow or, the cable 1203, 1205 can run to another backplane (not shown) to extends the present invention to multiple frames, if losses permit.

Figure 13:
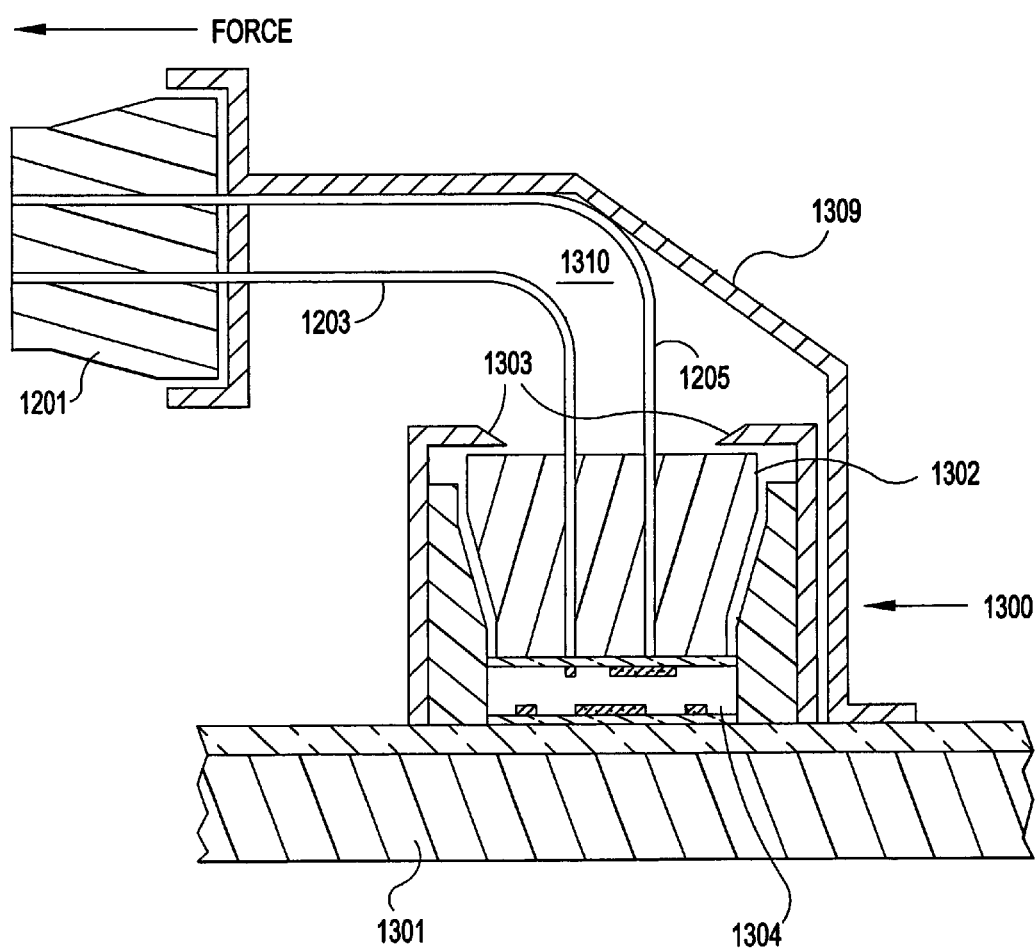
FIG. 13 shows an example of a board-to-backplane connector assembly according to a preferred embodiment of the present invention.

FIG. 13 shows an example of a board-to-backplane connector assembly 1300 according to a preferred embodiment of the present invention. A board-backplane optical jumper 1310 includes a pair of plugs 1201 and 1302 attached to either end of optical cables 1203, 1205 and connects the circuit board 1301 to a backplane (not shown in this example). Spring clamps on board optical sockets 1303 hold the board plug 1302 in place to provide an optical connection to an onboard transceiver structure 1304, substantially similar to a transceiver, e.g., 1000 in FIG. 10. A spring 1309 attaches across the optical jumper 1310 to provide tension for adequate optical coupling and to maintain plug 1201 inserted into a backplane optical socket.

Figure 14:
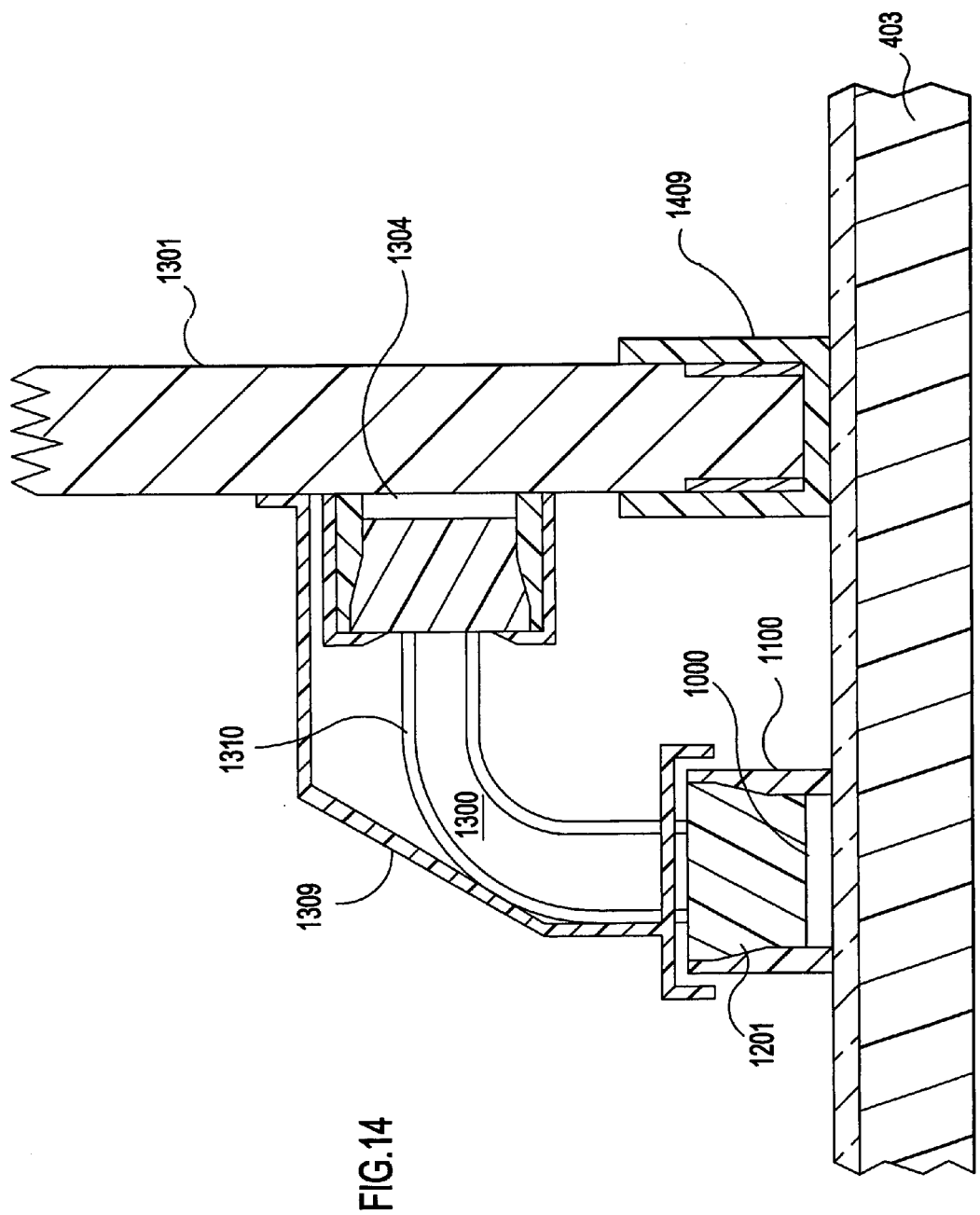
FIG. 14 shows an example of a preferred board attached to the backplane.

FIG. 14 shows an example of a preferred board 1301 attached to the backplane 403. The board 1301 is inserted on an edge into a typical electrical edge connector 1409 on the backplane 403. An optical jumper 1310 in a connector/cable assembly 1300, optically connects the board 1301 to the backplane 403. The spring 1309 in the connector/cable assembly 1300 is mounted on the board 1301 and forcibly holds the backplane plug 1201 in backplane optical socket 1100. Preferably, when the board 1301 is inserted in the electrical edge connector 1409, each backplane plug 1201 automatically mates with an optical connector 1100 in the backplane optical socket 1100 making the optical connections. The optical signal repeats in both transceivers 1000, 1304 such that the total connection loss is due to the 2 raw interfaces at the plugs 1201, 1302. Since the plug-to-plug link budget can be ample (3–6 dB or even larger, if needed), the mechanical tolerances can be loose, and the cost of these plug and flange structures can be very low.

It should be noted that each connector/cable assembly 1300 can be used for a parallel bus interconnection. For example, with a linear array of lasers on 125 micron centers, a 1 inch wide plug having 2 rows of fibers could easily accommodate 80 signals in and 80 signals out. This can be used to implement an 8-byte bus with parity and control signals as discussed hereinbelow. Such a plug would have a form-factor and tolerance similar to a phone jack.

Figure 15:
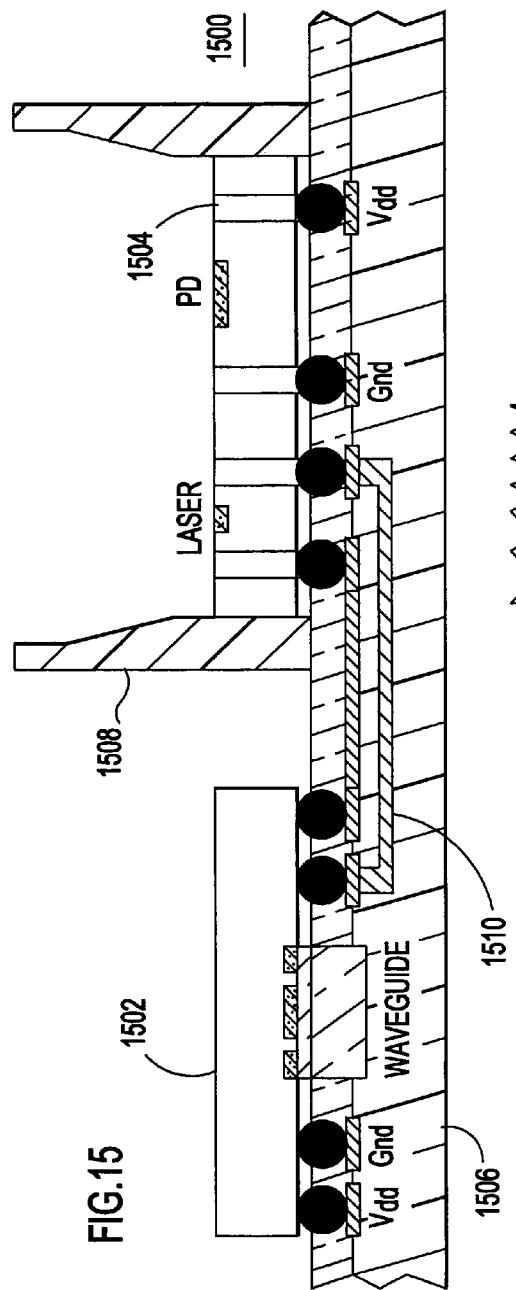
FIG. 15 shows an example of an alternate embodiment wherein a transceiver pair are mounted side by side rather than stacked.

FIG. 15 shows an example of an alternate embodiment 1500 wherein a transceiver pair 1502, 1504 are mounted side by side on the backplane 1506 rather than stacked. In this embodiment, only the repeater chip 1504 is mounted in a flange 1508, where it couples to a plug (not shown). The backplane chip 1502, which couples to backplane wave guides, is joined to the backplane 1506 outside the socket 1508. The two transceivers 1502, 1504 are connected through backplane wiring 1510 at a sufficiently short distance to accommodate the desired speed.

Figure 16:
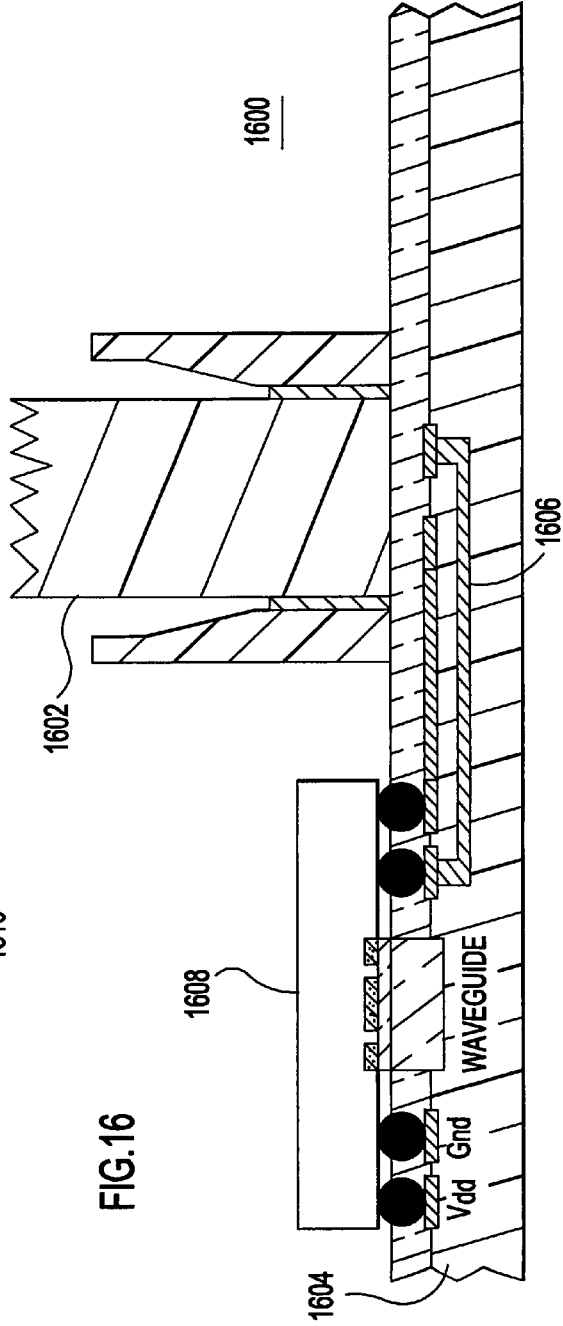
FIG. 16 shows another example of an alternate embodiment wherein optical signals are contained within each board.

FIG. 16 shows another example of an alternate embodiment 1600 wherein optical signals are contained within each board 1602, 1604. In this embodiment, electrical board signals in backplane wiring 1606 only travel a very short distance to the electro-optical transceiver 1608.

Figure 17:
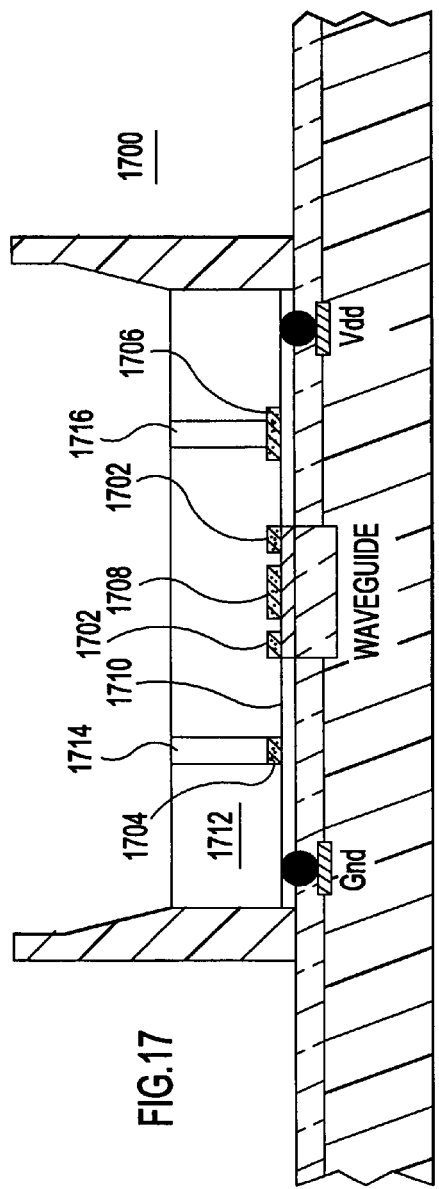
FIG. 17 shows of a single chip alternate embodiment wherein all lasers and photodiodes are on the same surface of a single optoelectronic chip.

FIG. 17 shows a single chip alternate embodiment 1700 wherein all lasers 1702, 1704 and photodiodes 1706, 1708 are on the same surface 1710 of a single optoelectronic chip 1712. In this embodiment, both top emitting laser 1702 and top sensing photodetector 1706 are on the bottom surface 1710 and optical signals pass through optical vias 1714, 1716, e.g., a matched-index material, in the chip 1712.

Optionally, the transceiver chips in the above embodiments may be soldered to the backplane. However, such permanently attached components can cause service problems. If a transceiver dies, the assembly cannot be repaired without disassembly, unsoldering the defective transceiver from the backplane and soldering on a new one. This has proven impractical in the field. So, typically, systems have completely passive backplanes with no permanently or semi-permanently (soldered) attached active elements that might need to be replaced.

Figure 18:
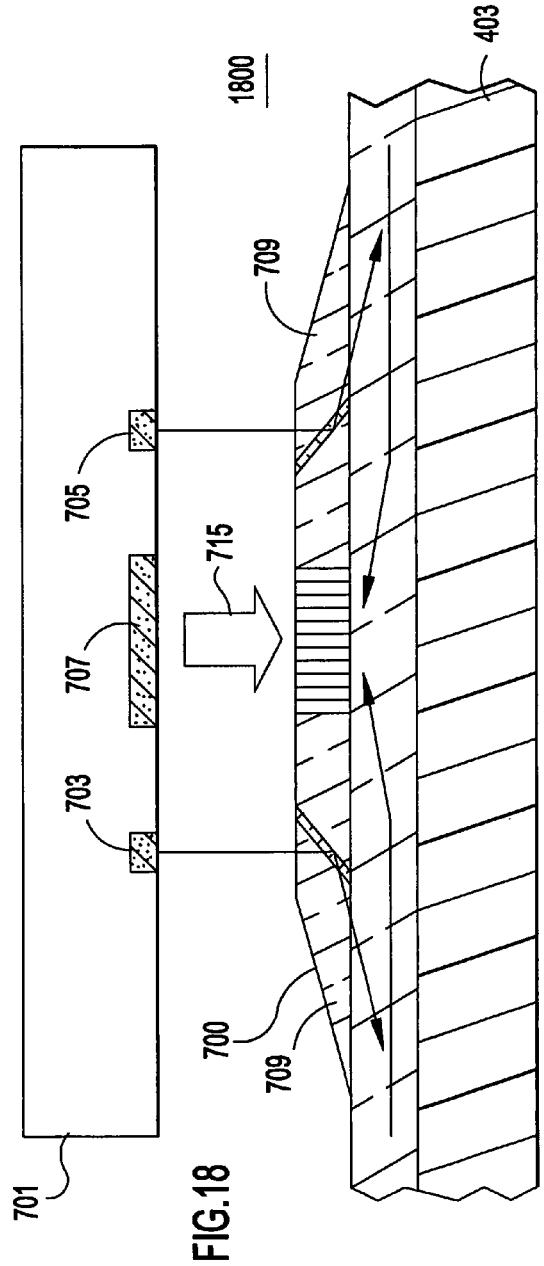
FIG. 18 shows an example of a preferred passive backplane structure.

Accordingly, FIG. 18 shows an example of a preferred backplane sub assembly 1800, which is a passive structure including a backplane 403 with the grating structures 700 bonded to the backplane channels and a butting connection between the transceiver chips 701 and the grating 715. The gratings structures 700 are attached permanently with optical glue to become part of the preferred passive backplane sub assembly 1800.

Figure 19:
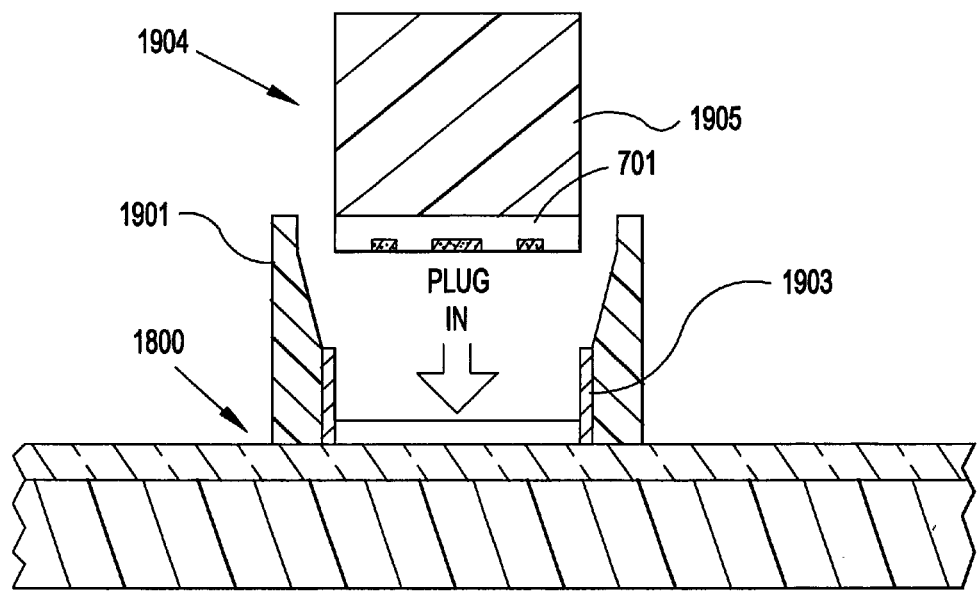
FIG. 19 shows facilitation of the butting connection to the passive backplane of FIG. 18.

FIG. 19 shows facilitation of the butting connection. The female flange structure 1901 is installed on the backplane sub assembly 1800 around the grating structure to provide a guide. In addition, metallic fingers 1903 in the flange structure 1901 facilitate an electrical connection to a pluggable unit 1904. The pluggable unit 1904 includes the transceiver chip 701 bonded to a backing structure 1905. The metallic fingers 1903 contact side electrical contacts (not shown) on the chip providing chip power. The unit 1901 is butt-coupled to the grating structure on the backplane, the backplane is fully passive and the transceivers are fully serviceable. If a transceiver fails, the transceiver assembly can be unplugged and the failed transceiver can be replaced with a new transceiver unit 1901, plugged in as a replacement.

Figure 20:
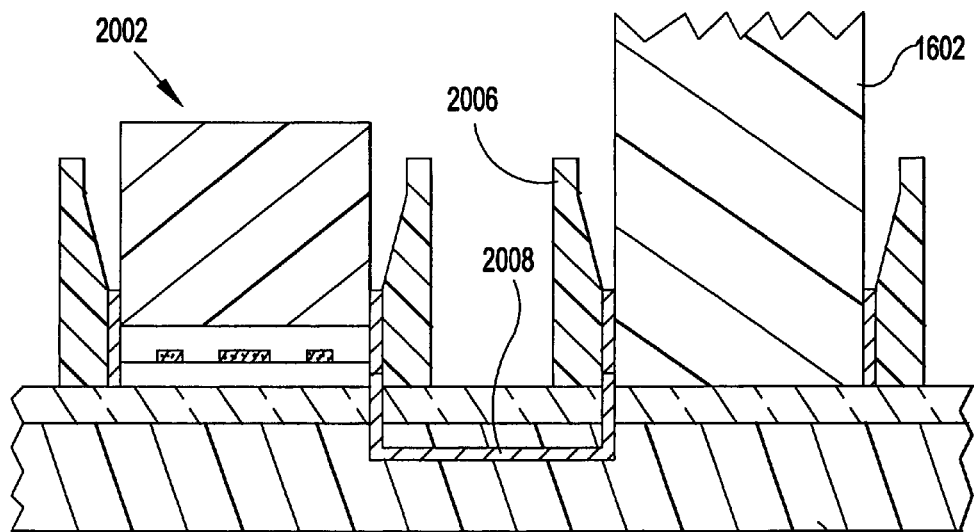
FIG. 20 shows an alternate embodiment with replaceable transceivers analogous to the embodiment of FIG. 16.

FIG. 20 shows an alternate embodiment with replaceable transceivers 2002 analogous to the embodiment of FIG. 16. The board 1602 is connected electrically to the backplane 2004. The transceiver 2002 is physically adjacent to the board connector 2006, and short backplane wires 2008 connect the board signals to the elecro-optical transceiver 2002. This embodiment operates substantially the same as the embodiment of FIG. 16, except the transceiver 2002 is easily replaceable in FIG. 20.

Figure 21:
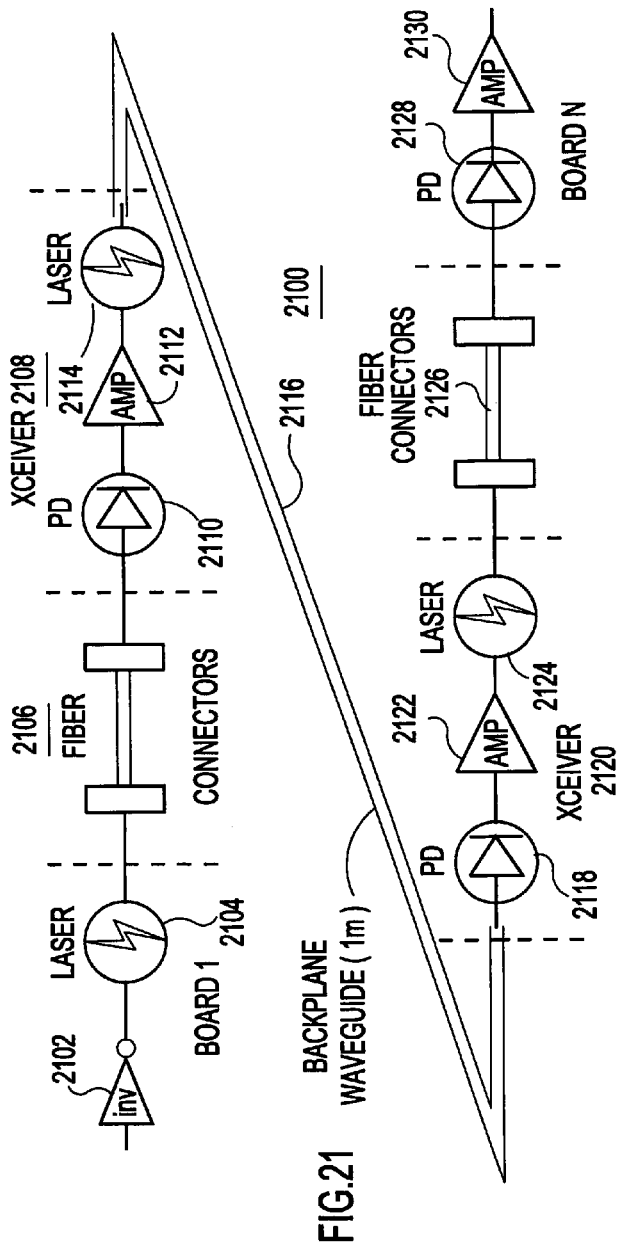
FIG. 21 shows a schematic representative of a worst case system path.

FIG. 21 shows a schematic representative of a worst case system path 2100, e.g., for the backplane assembly 400 of FIG. 4. An electrical signal originating in inverter 2102 is converted to light in a first laser 2104 on a first Board, e.g., Board 1 in FIG. 5. The light passes through an optical jumper 2106 to a backplane transceiver 2108, e.g., chip 1003 in FIG. 10. A photodetector 2110 converts the optical energy to electrical, which is amplified by amplifier 2112. The output of amplifier 2112 is converted back to light in laser diode 2114. The laser diode 2114 drives an optical channel 2116 in a backplane, e.g., 401 described hereinabove, which in this example is 1 meter long. A photodetector 2118 in another transceiver 2120 at the other end of the optical channel 2116 converts the optical energy from the backplane optical channel 2116 to electrical energy that is amplified by amplifier 2122. The output of amplifier 2122 is converted back to light in laser diode 2124. The laser diode 2124 drives another optical jumper 2126 connected to a receiving board (e.g., Board N in FIG. 5) at the other end of the backplane optical channel 2116. A photodetector 2128 in the receiving board converts received optical energy to electrical, provided sufficient optical energy arrives. The electrical energy from photodetector 2128 is amplified by amplifier 2130 and distributed on board.

Thus, in this example there are 6 signal conversions and 1 meter of transit. Each of the conversions takes on the order of 10 picoseconds and the transit time is roughly 5 nanoseconds. Thus, the end-to-end latency is dominated by transit time and roughly 5 nanoseconds. Channel frequency is limited by the response of the slowest amplifier in the path and/or, for a parallel bus, the skew between signals.

So for an 8-byte bus example provided hereinabove, the transceivers for all bits of the 8 byte quanta reside on the same chip minimizing response variation and skew. Further, for a parallel bus application, the signals should be sent source-synchronously, i.e., with an accompanying clock signal as one of the spare bus signals. Furthermore, because the electro-optical devices and amplifiers response is in the 10 s of picoseconds, this arrangement can readily accommodate signals of several Ghz (perhaps 10 Ghz) without resorting to exotic signaling techniques. Also, at these operating speeds, channel latency will be several cycles because latency is dominated by transit time, 5 nanoseconds in this example.

Latency that is several cycles long poses a challenging arbitration problem for a shared bus implementation. Specifically, between two boards on the backplane, the signal latency is primarily determined by the physical distance on the backplane between the two boards. As can be seen from the above examples, this distance range from inches for adjacent boards (hence a cycle or two) to as much as a meter (10s of cycles). Therefore, when the boards in the shared bus system all vie for the bus, the requesting signals arrive at different times at each board's bus arbitrator, i.e., depending on where each of the requesting boards reside on the backplane. Further, different boards may see the order of arrivals differently. Since each of the boards most likely will not see the requests in the same consistent order, arbitration protocol is required to guarantee that the arbitration logic makes consistent bus grant decisions.

For example, N backplane physical channels of the control channels are allocated for a "bus request" signal for each board. Each "bus request" signal is an assert only signal, i.e., it is asserted (e.g., carrying optical energy) only when a board is requesting the bus. Further, it remains asserted until bus control is granted to the requesting board. Typically, the arbitrator or arbitration master board (e.g., the physically center most board on the backplane) grants board requests consistent with the observed order of receiving requests. Each board (other than the arbitrator) is assigned an identification or bus grant ID. The arbitrator grants bus control by selecting the bus grant ID for one of the boards, e.g., by providing the ID on a $\log_2(N)+1$ bus grant channel dedicated to bus grant signaling, e.g., by optically signaling the grant ID in hexadecimal. Likewise, the arbitrator synchronizes arriving bus grant IDs on the 80-pin bus with a source-synchronous clock that arrives at the boards with the bus grant Ids.

Figure 22:
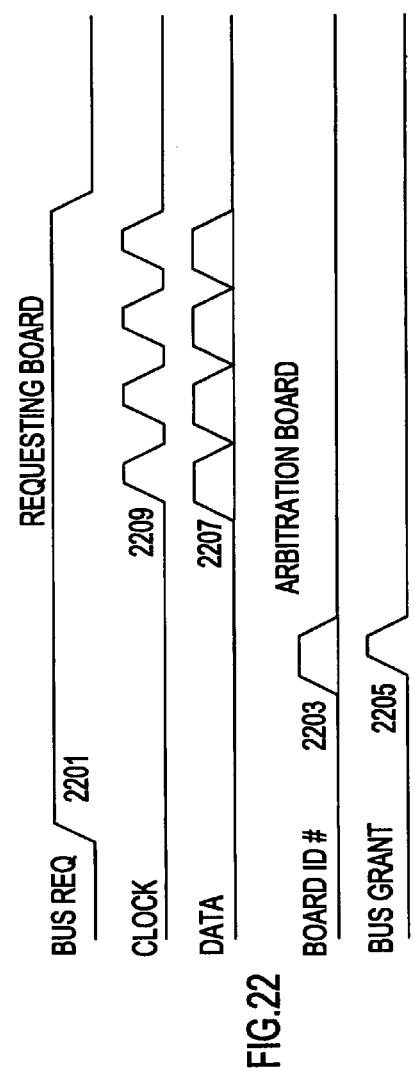
FIG. 22 shows an example timing diagram of typical optical bus protocol for a preferred embodiment bus.

FIG. 22 shows an example timing diagram of typical optical bus protocol for a preferred embodiment bus wherein a single arbitration board (which is uniquely selected by the service processor) manages communications amongst any suitable number of boards, e.g., connected to a preferred embodiment backplane. In this example, the timing shown is for the selected requesting board. First, a requesting board asserts its BUS REQ signal 2201 to request bus access. Since multiple boards may be requesting bus access simultaneously, the arbitration board chooses among the requesting boards, i.e., chooses one by placing the ID# of the selected board on the BOARD ID# data lines 2203. Then, the arbitration board issues a trigger pulse on the BUS GRANT control line 2205, granting bus control to the selected board. After some time, i.e., the backplane propagation delay from the arbitration board to the farthest boards, all boards see the selected board ID# and become aware that the selected board has the bus. Then, selected board becomes bus master and sends its data 2207, four consecutive packets in this example. In parallel and simultaneously, the selected bus master board provides its clock 2209, a source synchronous clock, on the associated clock channel with the data 2207. Any and all of the remaining (unselected) boards synchronize data receipt to the clock 2209 to capture data from the bus master board. When the data transfer is complete, the BUS REQ signal 2201 is dropped, informing the arbitration board that the bus is available for another requestor.

Figure 23:
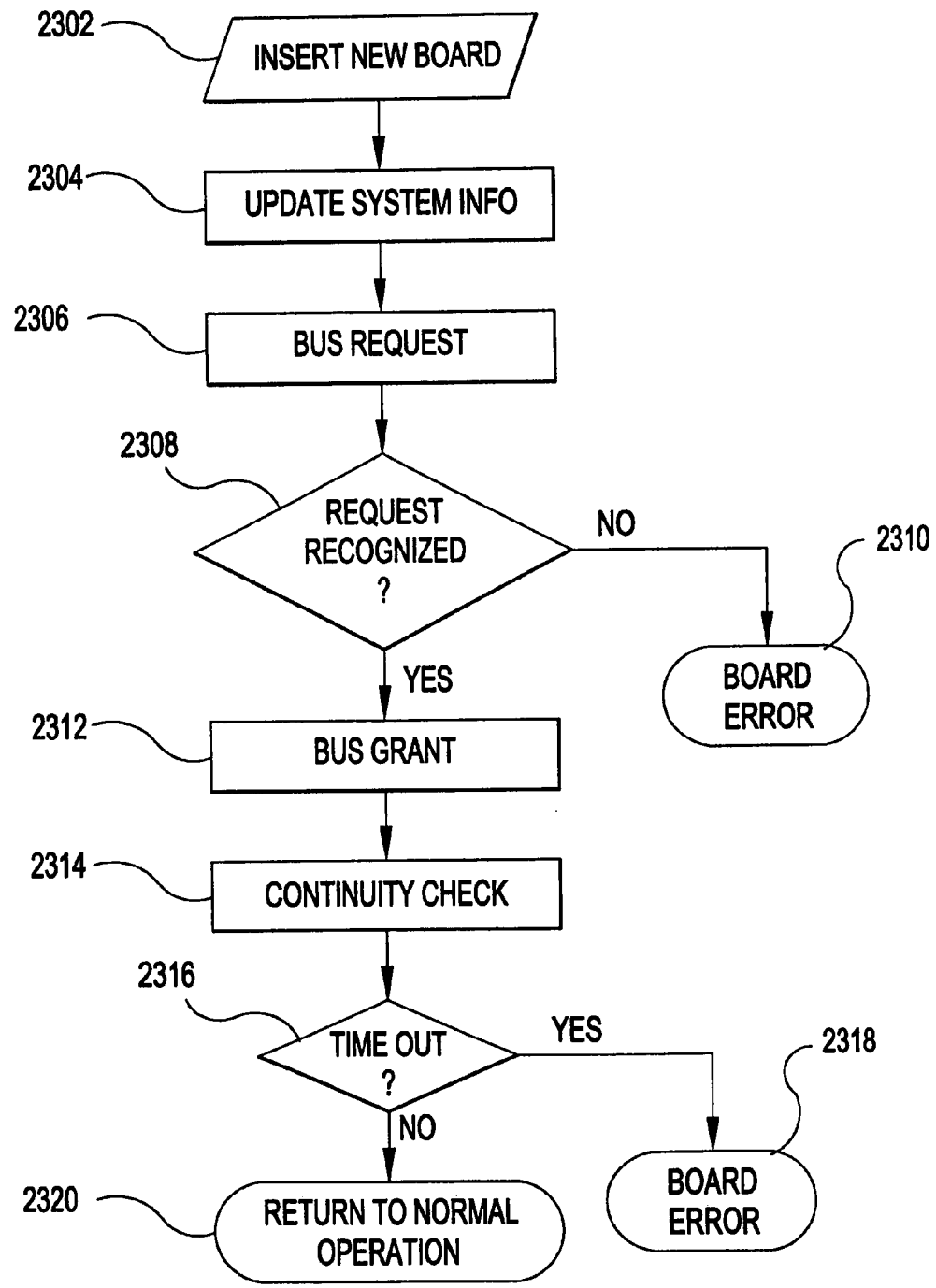
FIG. 23 shows an example of how the arbitration board manages the above described optical continuity check of FIG. 9B.

As noted hereinabove and shown in the example 2300 of FIG. 23 the arbitration board manages the optical continuity check 920 in FIG. 9B whenever a newly inserted board has split receiver optical transceivers 900 described hereinabove with reference to FIG. 9A. As a new board is plugged into the backplane or frame, the service processor tells the arbitration board which slots are present and tells the new board that it is NOT the arbitration board. The arbitration board ignores any spurious bus request signals from unassigned slots and, the unassigned slots are empty to the arbitration board. Further, the arbitration board ignores boards in identified empty slots until the service processor informs it that a board is in the slot.

In step 2302 a technician plugs new board into a vacant slot. Then, in step 2304 the technician informs the service processor that a board has been inserted in a formerly vacant slot. The service processor informs the arbitration board that the new board was inserted and in which slot. Thereafter, the arbitration board recognizes bus requests from that slot. In step 2306 the newly added board begins self test by placing a bus request. In step 2308 if the arbitration board does not receive the bus request, the new board times out and in step 2310 the technician is notified by the service processor that something is wrong with the new board. However, if in step 2308 the arbitration board receives the request, eventually, in step 2312 it grants the bus to the new board. The new board asserts an electrical Test signal that is wired ORed on the backplane and commonly connected to all slots. Then, in step 2314 with the Test signal asserted, the new board can run any desired I/O tests. When the "Test" signal is asserted, other system boards ignore activity on the optical bus (i.e., bus activity is a don't care to prevent mistaking some test pattern as a command and taking some wrong action). Concurrently, the arbitration board times the optical continuity tests. If the continuity test takes too long, the arbitration board times out in step 2316 and in step 2318 sends an electrical Clear Test signal on another commonly connected wired ORed backplane line. The Clear Test signal notifies the service processor that something is wrong with the new board. Also, when the new board sees the "Clear Test" signal, it shuts off its optical outputs, and tries to terminate self tests. On the other hand, if the new board completes the test before the arbitration board times out, in step 2320 the new board signals completion by briefly indicating completion the Clear Test line, drops its bus request optical signal and is ready to run.

Advantageously, the present invention addresses all of the problems found in state of the art systems. In particular, the present invention is directed toward a large switch or server environment in which there are multiple boards connected to a backplane. The present invention allows for a wide range of wave guide materials (i.e., is tolerant of channel loss) and does not require precise mechanical alignment (i.e., is tolerant of large coupling losses in the board-to-backplane connectors). The present invention allows multidropping signals transmitted from one board, so that multiple boards can receive the signal and at a wide range of system scaling (i.e., a few boards to many boards) based on a single physical infrastructure (backplane).

Having thus described preferred embodiments of the present invention, various modifications and changes will occur to a person skilled in the art without departing from the spirit and scope of the invention. It is intended that all such variations and modifications fall within the scope of the appended claims. Examples and drawings are, accordingly, to be regarded as illustrative rather than restrictive.

We claim:

1. An electronic system comprising:
    a backplane with board to board signal wiring and a shared optical bus;
    a plurality of circuit boards with electronic components mounted thereon attached to said backplane;
    a plurality of optical jumpers, each of said plurality of optical jumpers optically coupling one of said plurality of boards to said backplane; and
    an optical transceiver at each end of each optical jumper relaying optical signals from said optical jumpers to a respective one of said backplane or one of said plurality of boards.

2. An electronic system as in claim 1, wherein said backplane is a multidrop backplane, said multidrop backplane comprising:
    a plurality of optical wave guides in a surface of said backplane, each of said wave guides being an optical wiring channel in said shared optical bus; and
    a plurality of optical grating structures attached to said surface, optically communicating with said plurality of optical wave guides and identifying board tap points on said surface.

3. An electronic system as in claim 2, wherein said multidrop backplane is a passive backplane, optical transceivers being connected to said plurality of optical gratings with a butting connection.

4. An electronic system as in claim 3, wherein each of said butting connections comprise:
    a female flange structure attached at one of said board tap points to said multidrop backplane; and
    a pluggable unit inserted in said female flange, said pluggable unit including a transceiver chip bonded to a backing structure, said transceiver chip being butt-coupled to one of said optical grating structures, whereby a failing said pluggable unit may be unplugged and replaced.

5. An electronic system as in claim 4, wherein said butting connections further comprise metallic fingers in said female flange structure contacting said transceiver chip, chip power being provided to said transceiver chip by said metallic fingers.

6. An electronic system as in claim 5, wherein said butting structure is one end of an optical jumper.

7. An electronic system as in claim 2, wherein each said optical transceiver is soldered to said backplane at a corresponding one of said plurality of optical gratings.

8. An electronic system as in claim 2, wherein each of said plurality of optical gratings comprises:
    a matched index layer tapered at either end of a material having an optical index matched the optical wave guide material;
    a low index material at said either end;
    a grating in said matched index layer passing a portion of optical energy from one surface to an other surface; and
    a pair of mirrors in said matched index layer angled directing incident laser energy passing from said one surface to said other surface in opposite directions away from said grating.

9. An electronic system as in claim 8, wherein said grating is located between said pair of mirrors.

10. An electronic system as in claim 9, wherein said optical transceivers at said optical gratings each comprises:
    a photodiode; and
    a pair of laser diodes located on opposite sides of said photodiode.

11. An electronic system as in claim 8, wherein said grating is a first grating and further comprising a second grating, said first grating and said second grating being located on opposite sides of said pair of mirrors.

12. An electronic system as in claim 11, wherein said optical transceivers at said optical gratings each comprises:
    a pair of photodiodes; and
    a pair of laser diodes, said pair of photodiodes located on opposite sides of said pair of laser diodes.

13. An electronic system as in claim 8, wherein each said optical transceiver comprises:
    a photodiode receiving optical energy and converting received energy into electrical energy; and
    an amplifier amplifying electrical energy; and
    at least one laser diode driven by amplified said electrical energy.

14. An electronic system as in claim 13, wherein ones of said plurality of optical transceivers are located at said grating structures.

15. An electronic system as in claim 14, wherein said ones located at said grating structures are mounted back to back and electrically communicating with each other.

16. An electronic system as in claim 15, wherein said at least one laser diodes in each said optical transceiver of said back to back mounted transceivers located closest said grating structure further includes a pair of laser diodes located on opposite sides of said photodiode.

17. An electronic system as in claim 14, wherein other ones of said plurality of optical transceivers are located in optical sockets adjacent said tap points.

18. An electronic system as in claim 17, wherein said at least one laser diodes in each said optical transceiver located closest to said grating structure further includes a pair of laser diodes located on opposite sides of said photodiode.

19. An electronic system as in claim 17, wherein said optical sockets include a tapered flange at each side of a respective said optical transceiver, each said tapered flange perpendicularly mounted to said backplane for receiving an optical plug.

20. An electronic system as in claim 19, wherein electrical connectors in said optical sockets extend along one or more of each said tapered flange from said backplane.

21. An electronic system as in claim 20, wherein each said respective optical transceiver receives power from said electrical connectors.

22. An electronic system as in claim 21, wherein said multidrop backplane is a passive backplane, said respective optical transceiver being connected to a respective one of said plurality of optical gratings with a butting connection.

23. An electronic system as in claim 22, wherein ones of said plurality of circuit boards connect to corresponding respective optical transceivers through said electrical connectors.

24. An electronic system as in claim 13, wherein a plurality of said optical jumpers connect a plurality of parallel optical signals between connected circuit boards and said multidrop backplane.

25. An electronic system as in claim 24, wherein said plurality of optical signals is at least one byte wide.

26. An electronic system as in claim 24, wherein said plurality of optical signals is a plurality of bytes wide, said plurality of optical signals further including a plurality of control signals.

27. An electronic system as in claim 26, wherein said respective optical transceiver is bonded to a backing structure, said respective optical transceiver and bonded said backing structure forming said optical plug, whereby a failing said optical plug is unplugged and replaced.

28. An electronic system as in claim 27, wherein said butting structure is one end of an optical jumper.

29. A multidrop backplane with board to board signal wiring and a sharable optical bus, said multidrop backplane comprising:
    a plurality of optical wave guides in a board mounting surface, each of said wave guides being an optical wiring channel in said sharable optical bus; and
    a plurality of optical grating structures attached to said board mounting surface, optically connected to corresponding ones of said optical wave guides and identifying board tap points on said board mounting surface.

30. A multidrop backplane as in claim 29, wherein each of said plurality of optical gratings comprises:
    a matched index layer tapered at either end of a material having an optical index matched the optical wave guide material;
    a low index material at said either end;
    a grating in said matched index layer passing a portion of optical energy from one surface to an other surface; and
    a pair of mirrors in said matched index layer angled directing incident laser energy passing from said one surface to said other surface in opposite directions away from said grating.

31. A multidrop backplane as in claim 30, wherein said grating is located between said pair of mirrors.

32. A multidrop backplane as in claim 30, wherein said grating is a first grating and further comprising a second grating, said first grating and said second grating being located on opposite sides of said pair of mirrors.

33. A multidrop backplane as in claim 30, wherein said multidrop backplane is a passive backplane, said plurality of optical gratings being connectable with optical transceivers by a butting connection.

34. A multidrop backplane as in claim 33, wherein said butting connection comprises:
    a female flange structure attached at one of said board tap points to said board mounting surface; and
    a pluggable unit inserted in said female flange, said pluggable unit including a transceiver chip bonded to a backing structure, said transceiver chip being butt-coupled to one of said grating structures, wherein a failing said pluggable unit can be unplugged and replaced.

35. A multidrop backplane as in claim 34, wherein said butting connections further comprise metallic fingers in the flange structure contacting side transceiver chip, chip power being provided to said transceiver chip by said metallic fingers.

36. A multidrop backplane as in claim 35, wherein ones of said electrical connectors in one or more optical sockets connect to circuit board edge connectors.

37. A multidrop backplane as in claim 30, further comprising:
    an optical transceiver soldered to said board mounting surface and located at one of said plurality of optical gratings.

38. A multidrop backplane as in claim 37, wherein each said optical transceiver comprises:
    a photodiode;
    an amplifier connected at an input to said photodiode; and
    at least one laser diode connected to an amplifier output.

39. A multidrop backplane as in claim 38, wherein said optical transceivers are mounted back to back with second optical transceivers and connected input to output with each other.

40. A multidrop backplane as in claim 39, wherein said at least one laser diodes is one in a pair of laser diodes in each of said optical transceivers at said grating structure said pair of laser diodes located on opposite sides of said photodiode.

41. A multidrop backplane as in claim 40, wherein other ones of said plurality of optical transceivers are located in optical sockets adjacent said tap points.

42. A multidrop backplane as in claim 41, wherein said optical sockets include a tapered flange at each side of a respective said optical transceiver, each said tapered flange perpendicularly mounted to said backplane for receiving an optical plug.

43. A multidrop backplane as in claim 42, wherein electrical connectors in said optical sockets extend along one or more of each said tapered flange from said surface.

44. A multidrop backplane as in claim 43, wherein ones of said electrical connectors are power connections.

45. A multidrop backplane as in claim 44, wherein ones of said electrical connectors in one or more optical sockets connect to circuit board edge connectors.

46. A multidrop backplane as in claim 45, wherein a plurality of said tap points includes a plurality of optical gratings optically connected to a plurality of parallel wave guides.

47. A multidrop backplane as in claim 46, wherein said plurality of parallel wave guides is at least one byte wide.

48. An optical grating structure tapered at either end and comprising:
    an layer of optically transmissive material having a selected optical index;
    a material at said either end having an optical index below the selected optical index;
    a grating in said layer passing a portion of optical energy from one surface to an other surface; and
    a pair of mirrors in said layer angled directing incident optical energy passing from said one surface to said other surface in opposite directions along said other surface and away from said grating.

49. An optical grating structure as in claim 48, wherein said grating is located between said pair of mirrors.

50. An optical grating structure as in claim 48, wherein said grating is a first grating and further comprising a second grating, said first grating and said second grating being located on opposite sides of said pair of mirrors.

51. An optical grating structure as in claim 50, wherein said optical grating structure is a transceiver grating attachable to a multidrop backplane.

* * * * *